United States Patent
Scaringe et al.

(10) Patent No.: US 6,170,320 B1
(45) Date of Patent: Jan. 9, 2001

(54) METHOD OF INTRODUCING AN ADDITIVE INTO A FLUID SYSTEM, ESPECIALLY USEFUL FOR LEAK DETECTION, AS WELL AS AN APPARATUS FOR LEAK DETECTION AND A COMPOSITION USEFUL FOR LEAK DETECTION

(75) Inventors: Robert P. Scaringe, Rockledge; Lawrence R. Grzyll, Merritt Island; Dwight D. Back, Melbourne; Joseph Mayer, Indian Harbor Beach, all of FL (US)

(73) Assignee: Mainstream Engineering Corporation, Rockledge, FL (US)

( * ) Notice: Under 35 U.S.C. 154(b), the term of this patent shall be extended for 0 days.

(21) Appl. No.: 09/058,254

(22) Filed: Apr. 10, 1998

Related U.S. Application Data

(62) Division of application No. 08/788,780, filed on Jan. 24, 1997, now abandoned.

(51) Int. Cl.[7] .............................. G01M 3/04; G01M 3/20
(52) U.S. Cl. .............................. 73/40.7; 73/40.5; 73/592; 252/67; 252/964; 436/3
(58) Field of Search ........................ 252/964, 67, 301.19; 73/40, 40.5, 592, 40.7; 436/3

(56) References Cited

U.S. PATENT DOCUMENTS

| | | | |
|---|---|---|---|
| 868,779 | * 10/1907 | Hammer | 252/301.33 |
| 1,915,965 | 6/1933 | Williams . | |
| 3,386,920 | * 6/1968 | Alburger | 252/301.19 |
| 3,567,932 | * 3/1971 | Alburger | 252/301.19 |
| 3,625,988 | * 12/1971 | Cyba | 508/583 |
| 3,640,889 | * 2/1972 | Stewart | 252/301.15 |
| 3,944,492 | 3/1976 | Wheeler | 252/50 |
| 4,064,059 | 12/1977 | Nebzydoski et al. | 252/49.9 |
| 4,112,335 | * 9/1978 | Gonser | 315/241 R |
| 4,157,970 | 6/1979 | Yaffe et al. | 252/46.7 |
| 4,179,386 | 12/1979 | Reinhard et al. | 252/46.6 |
| 4,201,683 | * 5/1980 | Brewster | 252/32.7 E |
| 4,229,658 | 10/1980 | Gonser | 250/504 |
| 4,249,412 | 2/1981 | Townsend, III | 73/40.7 |
| 4,279,254 | 7/1981 | Boschetti et al. | 128/395 |
| 4,320,018 | 3/1982 | Yaffe | 252/46.7 |
| 4,369,120 | 1/1983 | Stelz et al. | 252/68 |
| 4,550,275 | 10/1985 | O'Loughlin | 315/241 R |
| 4,641,518 | * 2/1987 | Hutchings | 252/301.19 |
| 4,662,940 | * 5/1987 | Monier | 106/33 |
| 4,708,810 | 11/1987 | Askew et al. | 252/50 |
| 4,758,366 | 7/1988 | Parekh | 252/68 |
| 4,775,794 | * 10/1988 | Behmann | 250/373 |
| 4,948,524 | 8/1990 | Kapuscinski et al. | 252/51.2 |
| 5,043,634 | 8/1991 | Rothwell, Jr. et al. | 315/246 |
| 5,147,569 | 9/1992 | DeRosa et al. | 252/47.5 |
| 5,149,453 | 9/1992 | Parekh | 252/68 |
| 5,167,140 | 12/1992 | Cooper et al. | 73/40.7 |
| 5,185,552 | 2/1993 | Suzuki et al. | 313/231.71 |
| 5,271,856 | 12/1993 | Patil et al. | 252/50 |
| 5,357,782 | 10/1994 | Henry | 73/40.7 |
| 5,424,440 | 6/1995 | Klem et al. | 548/114 |
| 5,440,919 | 8/1995 | Cooper | 73/40.7 |
| 5,523,008 | 6/1996 | Boden et al. | 252/50 |
| 5,605,650 | * 2/1997 | Cleary | 252/301.35 |

FOREIGN PATENT DOCUMENTS

92/07249   4/1992  (WO) .

OTHER PUBLICATIONS

Skoog, Douglas A. and West, Donald M., *Principles of Instrumental Analysis*, Second Edition, Saunders College, 1980, Figure 5–2, p. 116.

van der Waal, G., *Improving the Performance of Synthetic Base Fluids with Additives*, J. Synth. Lubr., vol. 4, No. 4, pp. 267–282, (1987).

* cited by examiner

*Primary Examiner*—Shean C. Wu
(74) *Attorney, Agent, or Firm*—Evenson, McKeown, Edwards & Lenahan, P.L.L.C.

(57) ABSTRACT

An additive is introduced into a fluid system and dissolved in a carrier fluid which is immiscible or slightly miscible in the fluid system, wherein the carrier fluid is subsequently removed from the fluid system. This method can be used to detect leaks, wherein an on-off UV light source, such as xenon light, can be used to detect the leak visually.

44 Claims, 4 Drawing Sheets

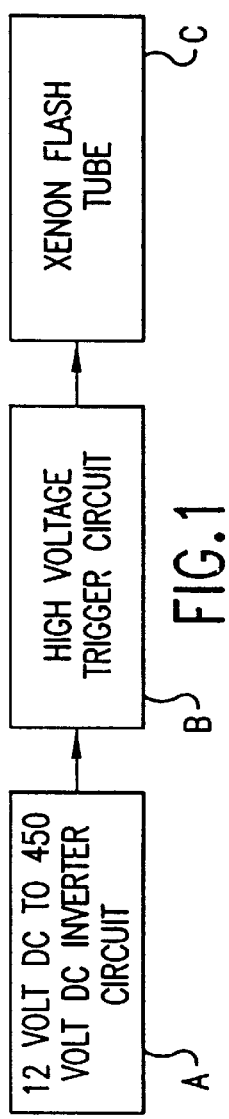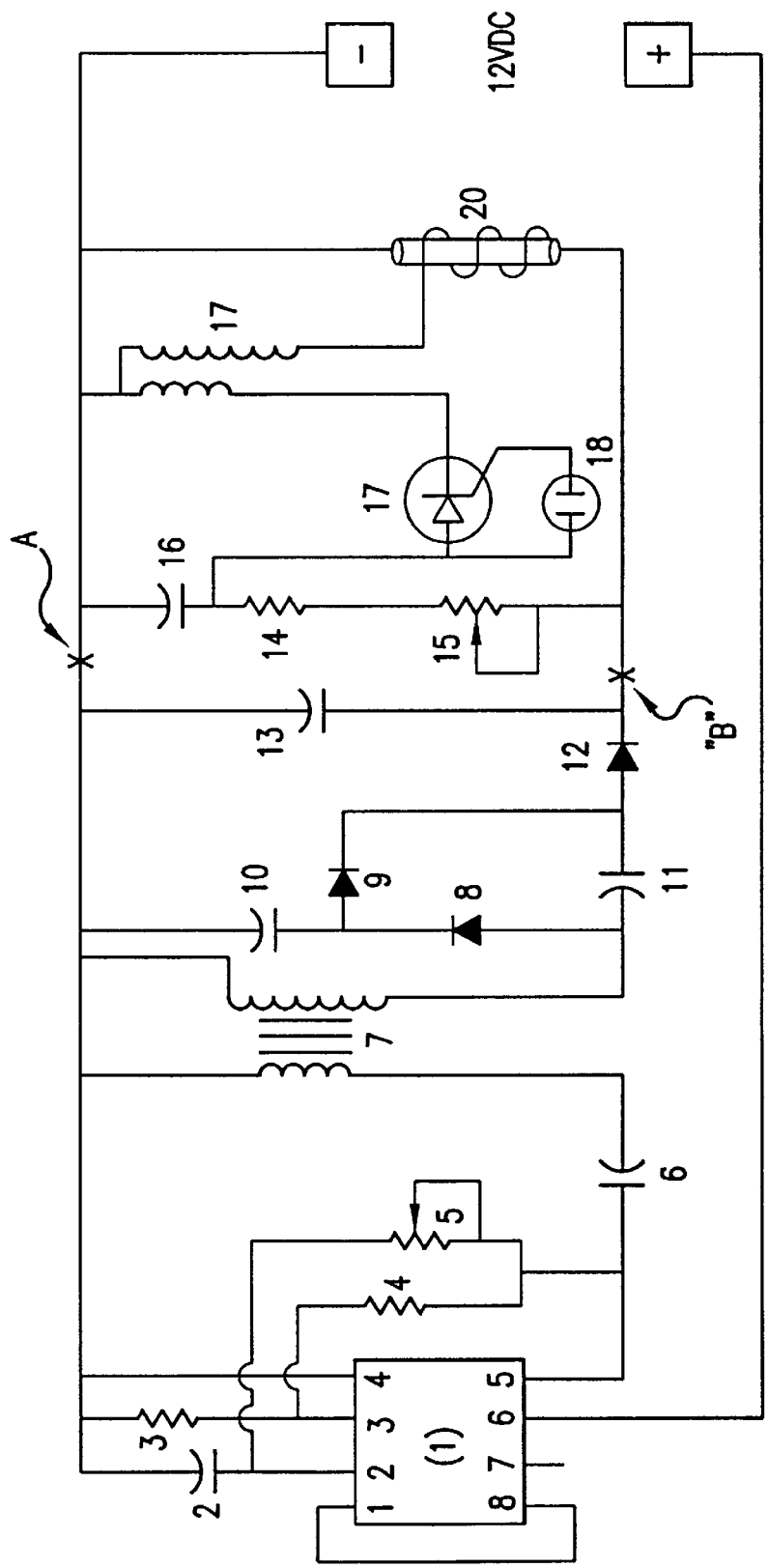

METHOD OF INTRODUCING AN ADDITIVE INTO A FLUID SYSTEM, ESPECIALLY USEFUL FOR LEAK DETECTION, AS WELL AS AN APPARATUS FOR LEAK DETECTION AND A COMPOSITION USEFUL FOR LEAK DETECTION

This application is a division of application Ser. No. 08/788,780, filed Jan. 24, 1997, now abandoned.

BACKGROUND AND SUMMARY OF THE INVENTION

The present invention is related to a method of introducing an additive into a fluid system, as well as to a method for detecting leaks and an apparatus and composition useful for leak detection.

Daylight visible and ultraviolet fluorescent dyes have been used to detect leaks in refrigeration systems utilizing fluorocarbon refrigerants and refrigerant oils. Typically, these dyes are introduced into the refrigeration system, and at the site of the leak, the leaking refrigerant, oil and dye are detected under normal or UV light.

More specifically, a leak-detecting trace fluid, which is generally a fluorescence (powdered) dye material dissolved in an oil or petroleum fraction carrier, is introduced into the refrigeration system. The fluorescent dye material is carried throughout the system, and at the location of a leak, the refrigerant, oil, and fluorescent dye material leak into the atmosphere. The refrigerant is subsequently vaporized, leaving an oil residue containing the fluorescent dye material. Application of a UV light to this area results in the illumination of the oil/fluorescent dye material.

U.S. Pat. No. 1,915,965 discloses a leak detector method for a compression refrigeration system. Daylight visible compounds, such as methyl violet, crystal violet, auramine B, rhodamine E, etc. are introduced into such systems as leak detectors.

U.S. Pat. No. 4,249,412 discloses a UV fluorescent dye composition comprising water, a nonionic surfactant, a 1.0 wt. % sodium fluorescein and a semi-synthetic thickening agent. This fluorescent dye composition is sprayed on the external surfaces of a system where the bubbles formed by the leak fluoresce under UV light.

Other prior art examples include U.S. Pat. No. 4,369,120, which discloses anthraquinone blue dyes for use as visual leak detectors of refrigerants, refrigerant oils, and mixtures thereof; U.S. Pat. No. 4,758,366, which discloses a UV fluorescent dye composition comprising a polyhalogenated hydrocarbon refrigerant, a refrigeration oil, or a mixture thereof, with a fluorescent dye; U.S. Pat. No. 5,149,453, which discloses a UV fluorescent dye composition comprising an effective amount of a fluorescent, alkyl substituted perylene dye combined with a refrigerant oil and a polyhalogenated hydrocarbon refrigerant; U.S. Pat. No. 5,357,782, which discloses a UV fluorescent dye composition comprising an optical brightener mixed with either mineral oil, polyalkylene glycol or polyol ester refrigeration lubricant; U.S. Pat. No. 5,167,140, which discloses a method of introducing a fluorescent dye solution into a system with an atomizing mist infuser, wherein four different formulas for the fluorescent dye solution are disclosed, wherein the dye solution is a fluorescent dye mixed with an appropriate refrigerant oil; WO 92/07249, which discloses a method and a sensor system for detecting hydrocarbon-containing fluids by fluorescent detection, wherein additives used in hydrocarbon-based fluids, such as gasoline, heating oils and motor oils, can fluoresce, and can be used to detect and locate the source of ground water contamination from gasoline and oil storage tanks using a fluorescent sensor which detects the presence of fluorescing materials such as Coumarin 153.

Furthermore, U.S. Pat. No. 5,440,919, discloses a method of introducing a UV fluorescent dye additive into a closed refrigeration system by placing the fluorescent dye on a swatch of material installed in a desiccant bag which is placed in a dehydrator or filter (i.e. filter-dryer) of the refrigeration system. The swatch is capable of releasing as well as adsorbing the dye. The refrigerant and system lubricant flow through the dehydrator and are then mixed with the fluorescent dye, thereby allowing the fluorescent dye to be carried throughout the system. Although this system allows the introduction of the fluorescent dye into the system without requiring the use of a carrier oil, it also requires that the dehydrator or filter-dryer of the system be changed in order to introduce the dye into the system.

Generally speaking, the standard industry method of introducing daylight visible or fluorescent dyes into a refrigerant oil, has been to dissolve the dye in the refrigeration oil and to introduce this mixture into the system. There are however currently several different types of oils that are used in refrigeration systems. For example, polyalkylene glycol (PAG), polyol ester (POE), alkylbenzene (AB) and mineral oils are all used in current systems and some of these oils (or their additives) are incompatible with one another in concentrations as low as 1%. This means that a service technician must carry an inventory of all different types of fluorescent dye mixtures, i.e. one for each oil type.

An even greater problem with the conventional approach is that the technician must first determine which type of oil is used in the system which is being checked for leaks, as often, the technician is called upon to repair a leak in a system which has not been previously serviced and in which the oil used is unknown. This presents a significant problem. We have recognized that a more universal fluorescent leak check solution which is compatible with all potential lubricants and delivery method is needed to simplify leak detection in refrigeration systems.

The type of daylight visible or fluorescent material used for leak detection is also critical because the additives used in oils can interact with the material or the material could directly and negatively affect the properties of the oil or refrigerant. Although the quantity of material used for fluorescent leak detection is generally small, on the order of a few percent by weight of oil or less, a material can adversely affect the properties or performance of the oil or refrigerant to which it is added. In addition, conventional fluorescent materials have not always maximized visible light emission from UV excitation with respect to the amount of fluorescent material added.

Another drawback to current leak detection techniques is that conventional fluorescence leak detectors have used a very bright mercury vapor lamp with a UV filter. Commercial UV fluorescent leak detection devices also use halogen light sources. Other suitable UV light sources are disclosed Skoog, et al., *Principles of Instrumental Analysis,* Saunders College, 1980, Figure 5-2, p. 116, which lists components and materials for spectroscopic instruments and lists several light sources, including a xenon lamp, as a source of visible light.

Flashing UV light has been used for various applications in the past. Typically these applications use excited xenon in a light tube to provide continuous light or to provide UV energy for chemical curing reactions, such as in dental reconstruction. Up until our present invention, however, flashing UV light has not been recognized as beneficial for leak detection.

For example, U.S. Pat. No. 4,279,254 discloses a UV light used on medical patients to radiate the skin. The UV electrical light circuit, which is not battery operated, counts pulse flashes in order to automatically shut off and avoid over-exposure as a safety measure; U.S. Pat. No. 4,112,335 discloses a rapid pulse UV light apparatus in which a UV light source is fed as a high frequency pulse into a high pressure (3 atmosphere) xenon light tube to cure epoxy resin tooth caps; U.S. Pat. No. 4,550,275 discloses a high efficiency pulse light source as a xenon light source to excite lasers; U.S. Pat. No. 5,185,552 discloses a vacuum UV light source which provides a high output UV light source using low pressure hydrogen or deuterium in a hollow tube at wave lengths below 180 mm; U.S. Pat. No. 4,229,658 discloses a dental xenon light apparatus which supplies UV and visible light and is used to cure tooth restoration materials by focusing the light on a small area of a tooth; and U.S. Pat. No. 5,043,634 discloses a pulsed light source using a pulsed xenon light tube coupled with a phosphorus coating which emits different colors of visible light as a navigational aid.

Industries in which leak detection is important have not recognized that leaks can be detected by administering a fluorescing material to any system using a carrier fluid injected at any pressure, regardless of oil type, and detected using a UV lamp. Moreover, we are not aware that anyone prior to our invention recognized that a visible dye can be used in addition to a UV fluorescing material to further facilitate visualization and location of leaks. Our recognitions provide a much simplified and advantageous method of leak detection.

An object of the present invention, is to provide a more effective method of introducing an additive into a system to avoid the need for a system specific carrier oil and the time consuming process of replacing the filter to introduce the additive.

Another object of the present invention is to provide a method of introducing an additive into a system which will not degrade the performance of the system.

Another object of the present invention is to provide a method of introducing conventional fluorescent or daylight visible dyes or mixtures thereof into a fluid system for leak detection.

Still another object of the present invention is to provide a method of introducing a conventional material with heretofore unrecognized UV-fluorescing properties into a refrigeration oil or lubrication system using a carrier solvent, in which the solvent is later separated from the oil or lubricant after use as a carrier.

The materials having fluorescence properties in accordance with the present invention are usually solid at room temperature, and are selected from a group of commercially available compounds, some of which are already used in the oil manufacturing industry as additives to promote the performance characteristics of oil. Many of these fluorescent materials are also soluble in lubricants and oils, whether the oil is petroleum-derived (mineral) or synthetic but up until now their ability to fluoresce has not been appreciated.

A yet further object of the present invention is to select a carrier solvent which will evaporate from the compressor oil, so that it can be removed by adsorption with a filter-dryer of a refrigeration system. The solvent should generally be immiscible or slightly miscible in the refrigeration system oil or lubricant, so that it can be removed from the system by adsorption using appropriately sized filter-dryers containing an adsorbent which adsorbs the solvent similar to those used in conventional refrigeration system design. The solvent should also be compatible with the lubricants and refrigerants currently used by the HVAC industry. A carrier solvent for the additive is removed after being used as a carrier in accordance with the present invention and thus greatly reduces concerns of both material and refrigerant incompatibility of the carrier solvent with the system.

Another object of the present invention is to provide daylight visible or fluorescent additives which are soluble in both the solvent carrier as well as the various types of refrigerant oils, i.e. synthetic or petroleum-derived. Solubility is desirable for at least two reasons. First, the additive is dissolved in the solvent alone for delivery into the refrigeration or air conditioning system. If the additive were insoluble in the solvent, the additive could precipitate or form a residue. As a result, inadequate amounts of additive would be delivered into the system or insoluble residues could clog key system components, such as the expansion device, and cause operational problems. Second, once adequate amounts of the additive are delivered into the system, the additive must be soluble in the specific refrigerant lubricant used in the system, allowing the additive to travel with the lubricant throughout the system to the location of the leak. The refrigerant/lubricant/additive mixture then leaks into the atmosphere at the site of the leak, leaving a lubricant/additive residue at the site which can be detected by visible light or by application of UV light to the area.

Furthermore, another object of the present invention is to overcome the problems and disadvantages of conventional leak detecting light sources, which include power consumption and poor detection capabilities, by providing a high-efficiency xenon flashing light source. We have found that the advantage in using a flashing light instead of, for example, a continuous light source, is that it makes the fluorescing material more noticeable. That is, the flashing light provides the operator with a continuous comparison between a leaking region with fluorescence and the same region with normal ambient light, thereby making the fluorescing material appear to flash and easier to detect.

Normally, xenon lights inherently flash at a frequency so that the light is easily perceptible as continuous to the human eye. According to the present invention, however, the light has an adjustable on-off duty cycle, wherein the light may be off for 0.5 seconds or more. As a result of the longer off-time, such units use significantly less power and make battery powered units practical.

These objects have been achieved in accordance with the present invention by a method in which an additive is introduced with a carrier fluid into a refrigeration system to detect system leaks.

An advantage of the present invention is that it can also use known fluorescent dye materials. Instead of dissolving the material in an oil or petroleum-based carrier which has to be compatible with the oil used in the system, however, our invention is based on the recognition that the fluorescent material can be of a type which is dissolvable in a solvent carrier which does not remain in the system. The fluorescent materials and solvents of the present invention are, to great advantage, universally soluble and, at the same time, fluorescent in petroleum-based and synthetic oils and lubricants.

According to a currently preferred embodiment, the carrier fluid is a non-oil carrier, such as an alcohol. When the carrier is an oil or lubricant, as used in the past, additives such as fluorescing materials, which may or may not have performance enhancing properties, can have very low solubility. In contrast thereto, alcohol generally has a high solubility for such fluorescing materials of the present invention, and therefore, will dissolve the additive with a comparatively smaller volume as compared to the volume of oil or lubricant which might be necessary to dissolve the same quantity of additive.

The present invention also advantageously uses additives with natural fluorescent characteristics which are not damaging to the performance of the oil, lubricant or refrigerant. Moreover, with the use of our invention and its general principles, the incorporation of certain additives into the system actually benefits the performance, wear, stability, and/or life of the oil or lubricant when the additive has anti-wear, anti-oxidant, viscosity improving, and/or dispersing properties.

According to the present invention, the extent to which the additives are used is essentially only limited by the solubility of the additive in the system fluid. The concentration of additive should, generally speaking, be limited to an amount below which precipitation occurs, because precipitation of the additive may be detrimental to the fluid system and performance.

Yet another advantage of the present invention is the use of mixtures of fluorescent materials and daylight visible dyes which, when used together, provide enhanced visual detection of the leakage and/or alter the fluorescent color of the fluorescent material to enhance detection of the mixture.

In accordance with the present invention, a method is utilizable by which an additive and a solvent carrier can be introduced into a refrigerant system, regardless of the system pressure and temperature or whether the system is or is not open to the environment. The solvent carrier can then be removed from the system by adsorption in a filter normally present in the system, leaving only the dissolved additive in the system oil or lubricant.

In summary, we have discovered, among other things, that the carrier solvent should have the following properties to obtain the benefits of our invention:

1. The solvent must be capable of dissolving the additive;
2. The solvent should ideally, but need not, be immiscible in all possible lubricants so that the solvent does not dissolve in the lubricant and become difficult to remove or reduce the lubrication properties of the lubricant;
3. The solvent should be compatible with all materials and fluids in the system; and
4. The solvent should be rapidly adsorbed by the molecular sieve, activated alumina, and/or carbon filter-dryers used in typical refrigeration systems so that the solvent can be removed from the system thereby leaving only the additive dissolved in the lubricant.

Xenon tubes used as a light source according to the present invention, advantageously produce a full spectrum of light very efficiently, without the generation of significant heat. This light can then be filtered to remove the visible and IR frequencies, leaving only the ultraviolet spectrum. The result is an intermittent, intense light of long wave ultraviolet black light or UV-A, typically in the 180 nm to 390 nm wavelength range of the electromagnetic spectrum.

Generally, the light sources for detecting fluorescing materials require a filter to filter-out visible light. Without a filter, the illumination of the fluorescing material is much less noticeable. Typically, the filter is a glass filter because the conventional continuous light source generates sufficient heat to damage inexpensive filters. According to the present invention, however, the xenon filter cooling effect advantageously results from a duty cycle in which there is a relatively slow on/off frequency.

Xenon light sources are generally in the form of xenon arc lamps, which burn continuously, or xenon flash tubes which are typically flashed at very high frequencies to approximate (i.e., appear to the naked eye as) a continuous light source. However, the present invention employs a xenon light which is turned on at a low frequency, with a very pronounced on and off cycle. Such xenon flashing lights generate significantly less heat and thus avoid potential safety concerns, reduce fabrication costs, and allow for the use of inexpensive plastic or glass lenses or the application of a UV filter material directly on the xenon bulb. Their utilization in leak detection of the type involved herein provides advantages not heretofore recognized.

Instead of using a continuous beam of UV light, it was found that, by introducing an intermittent (on/off duty cycle) UV light, the UV sensitive fluorescing material is more noticeable. The on/off UV light source allows a repeated comparison between the fluorescing leak indicator and the background, much like a flashing warning light is more noticeable to a driver at night. We also found that an adjustable flashing frequency allows the user to adjust the frequency to suit the user according to ambient light conditions. The intermittent light also advantageously consumes significantly less power, making possible the use of lightweight, low-cost, portable, battery-powered units.

BRIEF DESCRIPTION OF THE DRAWINGS

Other objects, advantages and novel features of the present invention will become apparent from the following detailed description when considered in conjunction with the accompanying drawings wherein.

FIG. 1 is an overall schematic of a xenon flash the circuit used in connection with the detection method of the present invention;

FIG. 2 is a schematic diagram of a first embodiment of a xenon lamp circuit used in connection with the detection method of the present invention;

DETAILED DESCRIPTION OF THE INVENTION

Figure 3:
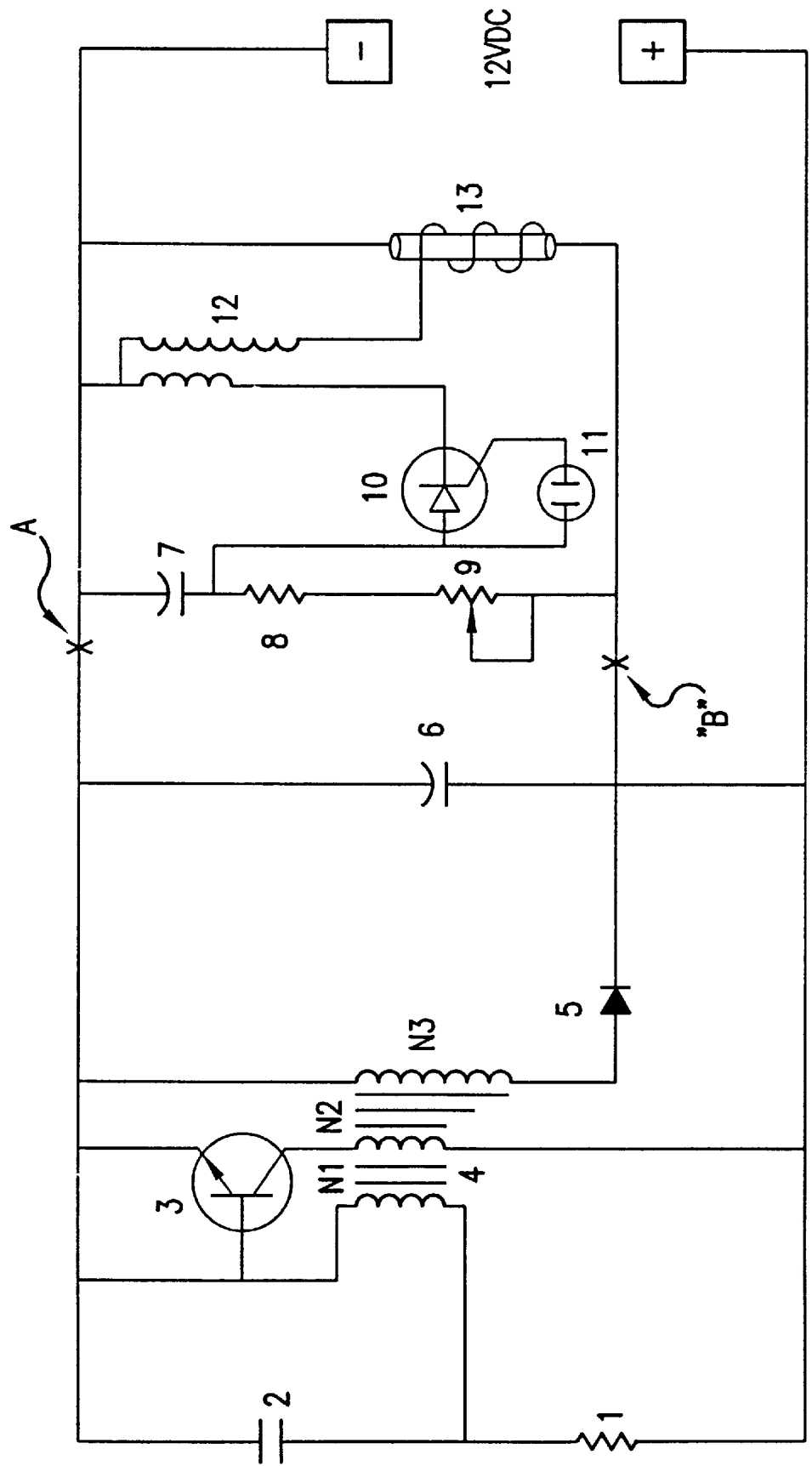
FIG. 3 is a schematic diagram of a second embodiment of a xenon lamp circuit used in connection with the detection method of the present invention.

According to a presently preferred embodiment of the present invention, ethanol has been identified as a suitable carrier fluid. We introduced ethanol into the oil of an actual system to verify that ethanol would vaporize in a conventional vapor compression system such as a heat pump, air conditioning or refrigeration system, would not remain in the oil, but instead would be adsorbed in the system filter-dryer within a reasonably short time period. The amount of ethanol introduced on the low pressure side of the compressor was 2 grams (or 1% of the oil weight). The ethanol vaporized from the oil and was adsorbed by the filter-dryer after several hours of operation. Therefore, ethanol was found to be a suitable carrier fluid to combine with an additive that is both soluble in ethanol and in all possible refrigeration oils for the reasons stated above.

For example, with regard to additive solubilities, we have measured the solubilities of fluorescent compounds N-phenyl-1-naphthylamine and N-phenyl-2-naphthylamine, which happen to fluoresce under UV light and are known oil and lubricant antioxidants, in several oils and alcohols. The former is soluble to as much as 30 weight percent in methanol, ethanol, and isopropanol, whereas the latter is soluble to about 6 weight percent in methanol and ethanol. N-phenyl-1-naphthylamine is also soluble to about 25 weight percent in POE oil, about 10 weight percent in AB oil, and about 3 weight percent in mineral oil.

Although ethanol is the currently preferred solvent, alcohols such as methanol and 2-propanol (isopropyl alcohol or isopropanol) can also be used. An alcohol such as ethanol which is immiscible in oil, however, is preferable because the alcohol is then more easily separated from the oil in the vapor compression cycle. Although ethanol is immiscible in oil, methanol is only slightly miscible in oil, and 2-propanol is completely miscible. The present invention contemplates the use of such miscible and slightly miscible alcohols, but with the understanding that they take longer to separate from the oil and reduce the lubrication properties of the oil. Therefore, even though ethanol is the preferred carrier fluid for use with current refrigerants and oils used in refrigeration compressors today, other alcohols such as 2-propanol and methanol can still be used alone or in combination with ethanol as a carrier fluid for the additive according to the present invention.

Additives which dissolve in a carrier fluid such as methanol, ethanol, and isopropanol, must also be compatible with the refrigerants, lubricants, and construction materials used in the system, because these additives remain in the system after the carrier fluid has been removed by the filter-dryer. It is important that the additive which remains in the system not affect the performance properties of the system fluid. One measure of this effect is through a wear test, more specifically ASTM method D2670. For example, wear tests performed according to ASTM D2670 for a 0.1 weight percent composition of N-phenyl-1-naphthylamine, a fluorescent additive also known in the oil industry as an anti-oxidant, in POE oil, show no effect on the wear properties of the base oil. It has been shown by van der Waal, G., *Improving the Performance of Synthetic Base Fluids with Additives*, J. Synth. Lubr., Vol. 4, No. 4, pp. 267–282 (1987), that alkylated diphenylemines and alkylated phenyl-2-naphthylamines can actually improve the wear properties of oils and lubricants, as measured by ASTM standard D2670.

The alcohol (i.e., methanol, ethanol, and isopropanol) or alcohol-additive solution can be introduced anywhere in the vapor-compression system. Even if introduced directly into the compressor oil, the alcohol-oil concentration is less than 1% and will not affect the lubrication properties of the oil, especially as the alcohol quickly vaporizes and is adsorbed within hours by the filter-dryer. As described above, experiments have verified that ethanol does vaporize and travel through the system where it becomes adsorbed in the filter-dryer (i.e. molecular sieve, carbon or activated alumina adsorption bed) of the system. The result is that the additive dissolved in the alcohol is transferred into the system by the alcohol. Therefore, after the alcohol-additive mixture is introduced into the system, the additive is dissolved in the oil lubricant and the alcohol is adsorbed by the filter-dryer. The additive, which is dissolved in the oil, is then transported through the system with the oil.

We have found that many more potential additive materials, covering several families of organic, inorganic and organometallic compounds having fluorescent properties, are available for the above purpose than was previously recognized. We found that the most intense and useful fluorescence behavior is achieved by organic compounds which contain aromatic functional groups and low-energy $\pi$-$\pi^*$ transition levels. In addition, compounds containing aliphatic and alicyclic carbonyl structures or highly conjugated double-bond structures can also fluoresce. Usually, the more rigid the molecular structure, the more likely the compound is to fluoresce. Fluorene ($\alpha$-diphenylenemethane), a rigid biphenyl compound, will fluoresce when impure and is soluble in alcohol, benzene, and ether. Some common benzene compounds, including chlorobenzene, bromobenzene, anisole, and benzoic acid, also fluoresce at 300–400 nm. Other fluorescing materials used as indicators in various solutions include fluorescein, $\beta$-naphthol, and eosin.

Organic compounds can also be chelated to certain metals to produce highly fluorescent organo-metallic structures, which are usually more rigid than their precursors. For example, 8-hydroxyquinoline exhibits increased fluorescence when complexed with zinc and is soluble in alcohol. Flavonol fluoresces when exposed to Zr or Sn and is generally soluble in organic solvents. Alizarin garnet R will fluoresce when chelated with Al and F. Consequently, metals which may be present in a refrigeration system with a solvent carrier can also react to form a fluorescent chelated compound by the introduction of the organic chelating agent into the system.

Additionally we have made the surprising discovery that certain compounds already used as additives by the oil industry have fluorescing capabilities, and these compounds could be used as fluorescent additives without any perceived concerns about degrading the performance of the oil base. Numerous additives are often added to lubricants and oils for various reasons, such as for anti-oxidation, anti-wear, anti-friction, dispersion improvement, and viscosity index improvement. Such compounds include benzothiazolines, benzothiazoles, benzotriazoles, aminoalklyphenothiazines, aminophenylbenzothiazoles, phenothiazines, phenols, 1,3,4-thiadiazoles and alkyl, aryl or alkylaryl derivatives of these compounds. Specific compounds include 2-aminobenzothiazole, benzothiazole, N-phenyl-1-naphthylamine, 2,2-dimethylbenzothiazoline, bis (benzothiazoline), benzotriazole, methylene bis(dibutyl dithiocarbamate), 2,6-di-tert-butyl-4-methylphenol, or 2,5-dimercapto-1,3,4-thiadiazole.

Furthermore, additives, compounds and derivatives containing other organic groups such as alkyl, amino, alkenyl, alkylnyl, cycloalkyl, aryl, or substituted aralkyl are also incorporated into lubricating and other working fluids, such as hydraulic fluids, by grafting the compound to a polyolefin backbone such as polyethylene or polypropylene (see U.S. Pat. No. 4,708,810; U.S. Pat. No. 4,948,524; U.S. Pat. No. 5,147,569; and U.S. Pat. No. 5,271,856) many of which contain components known to fluoresce. Additionally, organo-metallic compounds such as molybdenum dialkylphosphorodithioate and Zinc octyldithio-phosphate are also used because of their anti-wear, anti-oxidation and anti-friction properties.

Inorganic compounds such as zinc sulfide and cadmium sulfide, are also known fluorescent compounds used in lamp tubes and television screens. These materials and other inorganic compounds could also be administered into fluid systems by way of a carrier fluid and used for fluorescent leak detection.

Phenylnaphthylamines and diphenylamines, and their derivatives containing alkyl, aryl, or alkylaryl groups, are known anti-oxidants and oxidation stability additives for petroleum-based or synthetic lubricating oils (see U.S. Pat. No. 3,944,492; U.S. Pat. No. 4,064,059; U.S. Pat. No. 4,157,970; U.S. Pat. No. 4,179,386; U.S. Pat. No. 4,320,018; and U.S. Pat. No. 5,523,008). Examples of phenylnaphtylamines include N-phenyl-1-naphthylamine, N-phenyl-2-naphthylamine, N-(4-cumylphenyl)-1-naphthylamine, p-tert-dodecylphenyl-2-naphthylamine. Examples of diphenylaminies and dialkylphenylamines include diphenylamine, dioctyldiphenylamine, and didecyldiphenylamine.

Phenylnaphthylamines and dialkyldiphenyl amines are generally used as antioxidants in oils in concentrations of up to about 5% by weight. These compounds are also generally soluble in alcohols, mineral oils, and synthetic oils. The use of benzothiazole and its derivatives has been taught for the detection of enzymatic activity in U.S. Pat. No. 5,424,440. N-phenyl-1-naphthylamine has been used in studies of the membrane structure of chloroplasts using fluorescent probes (see Acros Organics catalog, Fisher Scientific, 1995–1996). Heretofore, however, these compounds have not been used as fluorescing materials for leak detection.

Several coumarin compound derivatives such as 2,3,6,7-tetrahydro-9(trifluoromethyl)-1H,5H,11H-[1]benzopyrano[6,7,8,ij]quinolizin-11-one (coumarin 153) also fluoresce and are sometimes also incorporated in gasoline and oils as additives. Another fluorescent coumarin compound, 7-(2H-naphtho[1,2-d]-triazol-2-yl)-3-phenyl-coumarin, is used as an optical brightener and sometimes also as a brightener and additive for thermoplastic materials. This compound is also soluble in alcohol and oils.

Table 1 summarizes some conventional dyes which were found to be at least slightly soluble in ethanol and oils, and which fluoresce when excited by UV light. Table 2 lists examples of compounds which are commonly used as additives in lubricants and oils, but which have not been recognized as advantageous additives for fluorescent leak detection.

TABLE 2

| ADDITIVE NAME | KNOWN SUPPLIER |
|---|---|
| N-phenyl-1-naphthylamine | Aldrich Chemical Co., Milwaukee WI |
| N-phenyl-2-naphthylamine | Aldrich Chemical Co., Milwaukee WI |
| benzothiazole | Aldrich Chemical Co., Milwaukee WI |
| 2-aminobenzothiazole | Aldrich Chemical Co., Milwaukee WI |
| 2,2-dimethyl benzothiazoline | ChemService, West Chester, PA |
| diphenylamine | Aldrich Chemical Co., Milwaukee WI |

Since the ring structures of these compounds are generally responsible for the fluorescing properties, substituted derivatives of these structures would be expected by those skilled in the art to have similar fluorescing properties. The general structure of the cyclic compounds summarized in Tables 1 and 2 which can fluoresce with UV excitation include coumarin compounds and derivatives thereof with the following structure:

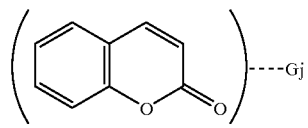

where G comprises groups comprising C, H, halogens, N, and/or S and j greater than or equal to 0; phenylnaphthylamine compounds and derivatives thereof:

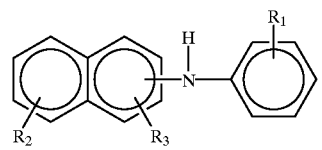

where $R_1$, $R_2$, and $R_3$ are groups comprising any combination of C, H, halogens, N, S, and/or O in cyclic or acyclic structures; dialkyldiphenylamine compounds and derivatives thereof:

TABLE 1

| CONVENTIONAL DYES | CHEMICAL STRUCTURE/NAME | KNOWN SUPPLIER |
|---|---|---|
| Coumarin 153 | 2,3,6,7-tetrahydro-9(trifluoromethyl)-1H,5H,11H-[1]benzopyrano-[6,7,8,ij]-quinolizin-11-one | Aldrich Chemical Co. Milwaukee, WI |
| Leucopure | 7-(2H-naphtho[1,2-D]triazol-2-yl)-3-phenyl-coumarin | Clariant Corporation 4000 Monroe Road Charlotte, NC 28205 |
| Basonyl Brilliant Yellow | $C_{22}H_{24}N_3O_2 \cdot CH_3O_4S$, Methine family | BASF Corporation Colorants 3000 Continental Drive N. Mount Olive, NJ 07828-1234 |
| Fluoretrack II | not available | Formulabs. Inc. P. O. Box 1869 Piqua, OH 45356 |
| FWT Red | not available | Formulabs, Inc. P. O. Box 1869 Piqua, OH 45356 |

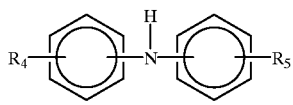

where $R_4$ and $R_5$ are groups comprising any combination of C, H, halogens, N, S, and/or O in cyclic or acyclic structures; benzothiazoline compounds and derivatives thereof:

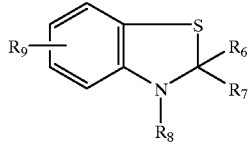

where $R_6$, $R_7$, $R_8$ and $R_9$ are cyclic or acyclic groups comprising C, H, halogens, N, S, and/or O; and benzothiazole and derivatives thereof:

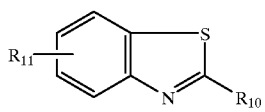

where $R_{10}$ and $R_{11}$ are cyclic or acyclic groups comprising C, H, halogens, N, S, and/or O.

Other heterocyclic and multiple-cyclic structures which can fluoresce under UV excitation include naphthalene, quinoline, isoquinoline, purine and carbazole, and derivatives thereof comprising C, H, halogens, S, N, and/or O. Daylight visible dyes such as rhodamine B, $C_{28}H_{31}ClN_2O_3$, crystal violet (or methyl violet), and anthraquinone with the following structure:

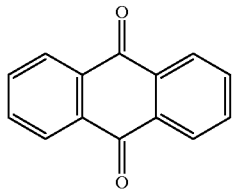

are soluble in alcohol and contain multi-cyclic components comprising C, H, halogens, N, and O.

Some of these compounds are yellow, however, which is not a highly visible color. These compounds can, however, be mixed with another dye which emits color in the visible spectrum and not fluorescent, and which is soluble in both refrigerant lubricants and solvents in order to obtain a more noticeable color. For example, yellow fluorescing materials can be mixed with Sudan Blue visible dye to create a mixture which will illuminate green under UV light.

Figure 5:
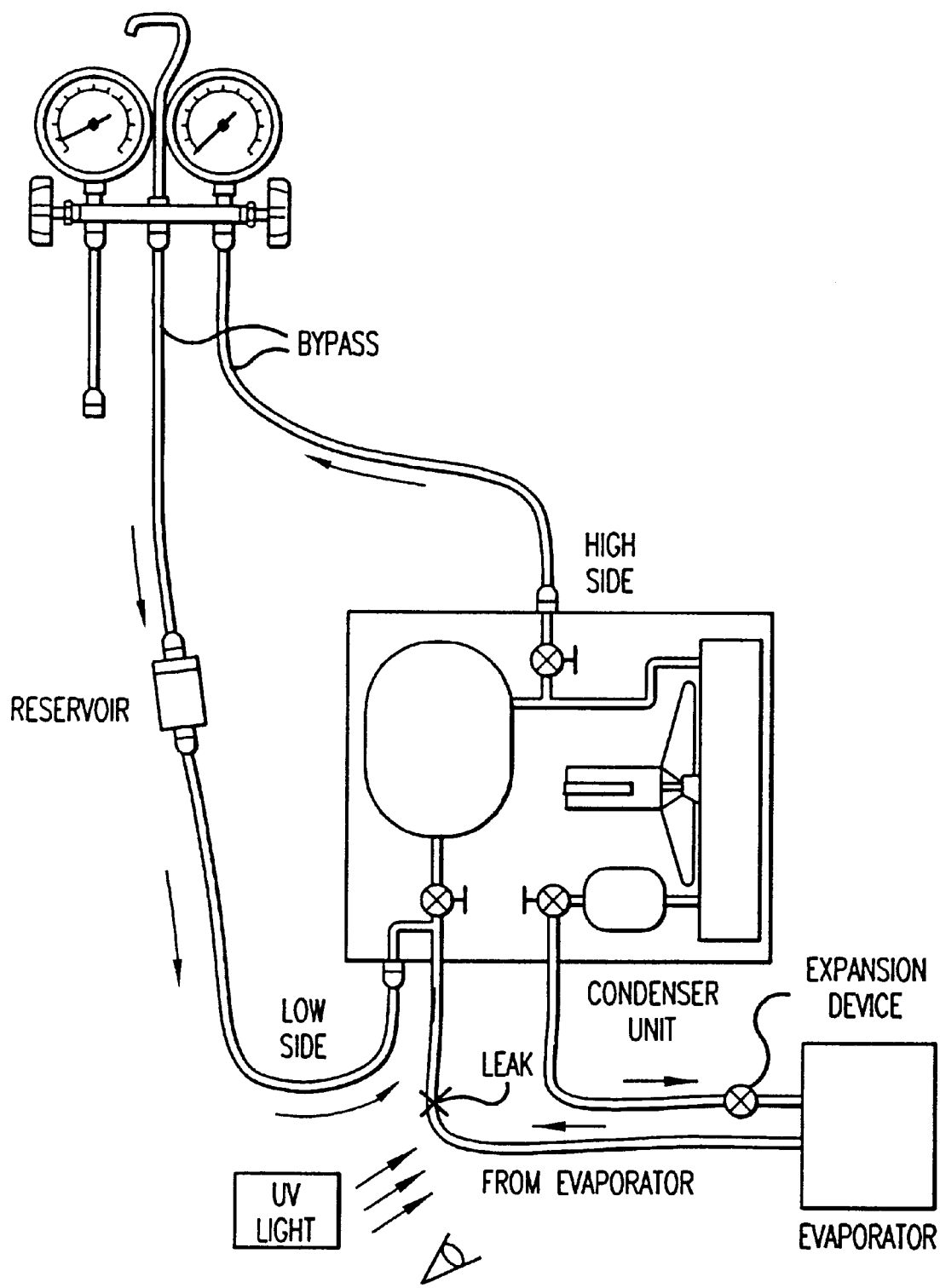
FIG. 5 is a schematic representation of a method of introducing an additive into a conventional fluid system with a UV light source being directed at an area with a leak and being observed.

The mixture of additive and carrier fluid may be introduced into a refrigerant system by connecting a reservoir containing the mixture in a bypass between the high pressure side and the low pressure side of the refrigeration system compressor is shown in FIG. 5. By introducing flow through the bypass, the mixture in the bypass reservoir is driven into the low pressure side of the system, and having done so, the bypass can be disconnected.

Consequently, the leak check fluid (i.e. the additive and carrier fluid) does not have to be oil specific, because the alcohol solvent is compatible with all oils potentially present in such systems, and in any case, is quickly removed by adsorption by the filter-dryer of the system. This novel method is contrary to the current practice of dissolving a dye in a lubricating oil which may not be compatible with another unknown oil in the system as noted above.

A low (on-off) frequency xenon lamp coupled with a UV filter is used with great advantage to provide the UV light. A conventional high pressure (up to as much as 4 atmosphere, quartz glass UV lamp is preferably used (such as manufactured by Amglo Kemlite Laboratories, Inc.). Quartz glass is preferred because of high UV transmissivity. Because the duty cycle for such a slow-flashing (i.e., flashing in the sense of turning the light completely on and off) light allows for greater cooling, the UV filter can either be applied directly to the quartz bulb surface or a thin glass (rather than a thick glass) or plastic filter can be used. In a preferred embodiment, the flash rate is from about 4 flashes per second to about 1 flash every four seconds.

In a currently preferred embodiment, the electrical circuit is advantageously operated from a battery power source to provide a high voltage D.C. power. A fundamental electrical circuit as seen in FIG. 1 comprises a high voltage section A which provides approximately 300–500 volts from a conventional battery power supply (not shown) and a trigger section B which intermittently provides approximately 6,000 to 11,000 volts (from the battery power source) to trigger the xenon flash tube C and cause the xenon light to flash. The frequency of the trigger voltage provided by the circuit B is, however, adjustable in order to adjust the on/off duty cycle of the UV light.

To specifically implement the above described high voltage and trigger voltage circuits A and B, three different embodiments of adjustable duty cycle xenon lamp circuits are discussed in further detail below with reference to FIGS. 2, 3 and 4.

The xenon flash tube circuit in FIG. 1 includes a high voltage DC to DC inverter, a trigger circuit and a xenon flash tube.

The inverter consists of a 12 volt source from a battery which is applied to an oscillator circuit which produces a high frequency 12 volt pulse fed into a step up transformer. The output of the transformer, typically 450 volts, is rectified to direct current using a voltage tripler circuit.

The high voltage of approximately 450 volts is connected to each of the two terminals on the xenon tube. This high voltage is also used to fire a SCR (Silicon Controlled Rectifier), which presents a pulse to a high voltage trigger coil at a rate determined by an RC constant and the firing voltage of the neon tubes found across the gate and anode of the SCR. The output of the trigger coil is connected to the center trigger wire of the xenon tube. When the SCR fires, a 450 volt pulse is sent to the trigger coil which steps up the voltage to 6,000 to 11,000 volts depending on the coil used. The resulting voltage applied to the xenon tube causes the tube to light and inherently flash.

Referring now to FIG. 2, the high voltage section A comprises a low-voltage audio amplifier 1, powered by 12 VDC power source. The amplifier 1 is used in a stable multivibrator mode with a frequency of above 1000 kilohertz as determined by capacitor 2 and variable resistor 5. The output at pin 5 at the amplifier 1 is a square wave that drives a transformer 7 via a capacitor 6. Transformer 7 is an audio transformer connected with a 4 or 8 ohm secondary as the primary. The 1200 ohm secondary delivers 450 volts peak to peak to diode 8, 9, 12 and capacitor 10, 11, 13 comprising of a voltage-tripler circuit which produces a 450 volt output at point "B".

For the xenon flash tube trigger section B, a 450 VDC voltage is applied to capacitor 16 through resistors 14, 15, the latter being variable. By varying the resistance of resistor 15, the charge time for full voltage on capacitor 16 can be varied to control the flash cycle time of the flash tube 20. The xenon flash tube 20 has the power supply voltage of 450 volts across its terminals, but requires a trigger voltage greater than 6000 volts to the trigger anode to cause the xenon tube 20 to fire. The trigger circuit consists of the capacitor 16, SCR 17, neon lamp 18, and trigger transformer 19. The capacitor 16 charges until the neon lamp 18 has approximately 90 volts across its terminals and breaks down, creating a conductive path between the gate and the anode of SCR 17 which then fires the SCR providing a conductive path between the anode and cathode. The full voltage of the capacitor 16 is passed through the SCR 17 and to the primary of the transformer 19. A stepped up secondary voltage of 10,000 volts to the flash tube anode results and fires the xenon flash tube 20. The recharge cycle begins again.

In the embodiment of FIG. 3, the circuit uses a pot core transformer 4 which performs two functions. Coil N1 provides a feedback to the driving transistor 3 configured in a modified Hartly oscillator. NPN transistor 3 oscillates at a frequency based on resistor 1, capacitors 2, 6 and switches a pulsed 12 VDC to the primary (N2 winding) of the transformer 4. Coil N2 provides the primary winding of a transformer. The voltage is stepped up in secondary coil N3 of the transformer and is rectified and filtered by diode 5 and capacitor 6 producing a output voltage to the flash tube trigger circuit at point "B".

A 275 VDC voltage is applied to the capacitor 7 through resistor 8 and 9. By changing the resistance of the resistor 9, the full voltage charge time on the capacitor 7 can be varied to control the flash recycle time of the flash tube 13. The flash tube 13 has a power supply voltage of greater than 275 volts across its terminals but requires a trigger voltage greater than 6,000 volts to the trigger anode to cause the xenon tube 13 to fire. The trigger circuit consists of the capacitor 7, SCR 10, neon lamp 11, and transformer 12. Capacitor 7 charges until neon lamp 11 has approximately 90 volts across its terminals and breaks down, creating a conductive path between the gate and the anode of SCR 10 that fires the SCR. The full voltage of the capacitor 7 is passed through the SCR 10 and to the primary of transformer 12 resulting in a stepped up secondary voltage of at least 6,000 volts to the flash tube anode which fires the xenon flash tube 13. The recharge cycle begins again.

Figure 4:
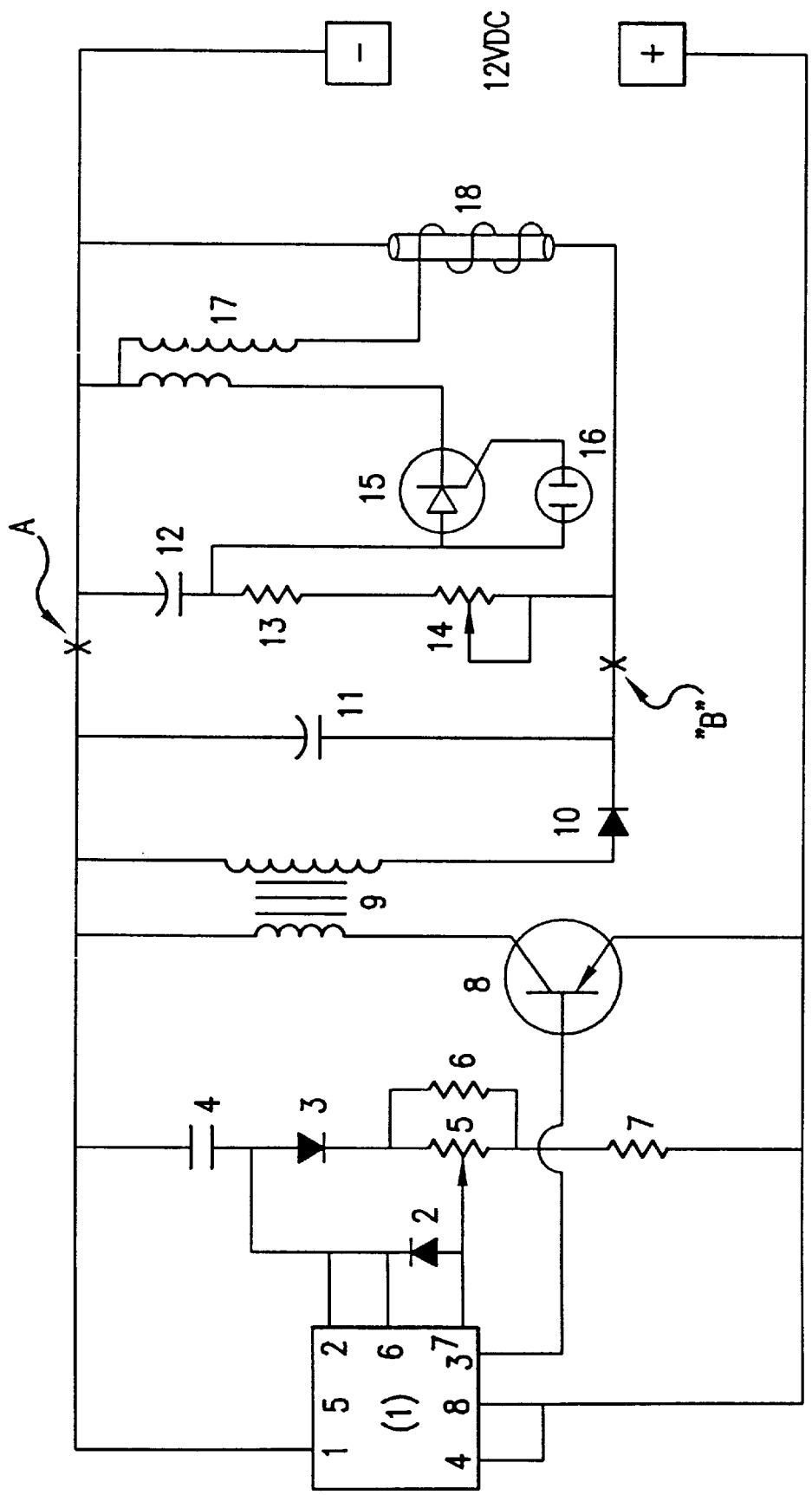
FIG. 4 is a schematic diagram of a third embodiment of a xenon lamp circuit used in connection with the method of the present invention.

In the embodiment of FIG. 4, the integrated circuit (IC) is a 555 timer circuit 1, powered by 12 VDC, used in a stable multivibrator mode. The frequency output of IC 1 is determined by potentiometer resistor 5. The IC 1 provides a pulsed voltage to the base of NPN transistor 8 which switches a pulsed 12 VDC to the primary of setup transformer 9. The voltage is stepped up in the secondary winding of the transformer and is then rectified and filtered by diode 10 and capacitor 11 producing an output voltage to the flash tube trigger circuit at point "B".

A greater than 275 VDC voltage is applied to capacitor 12 through resistors 13, 14, the latter being variable. By changing the resistance of variable resistor 14, the full voltage charge time on capacitor 12 can be varied to control the flash recycle time of the flash tube 18. The flash tube 18 has the power supply voltage of greater than 275 volts across its terminals but requires a trigger voltage greater than 6,000 volts to the trigger anode to cause the xenon tube 18 to fire. The trigger circuit consists of capacitor 12, SCR 15, neon lamp 16, and trigger transformer 17. Capacitor 12 charges until neon lamp 16 has approximately 90 volts across it's terminals and breaks down, creating a conductive path between the gate and the anode of SCR 15 that fires the SCR providing a conductive path between the anode and cathode. The full voltage of capacitor 12 is passed through SCR 15 and to the primary of transformer 17 resulting in a stepped up secondary voltage of 6,000 volts to the flash tube anode which fires the xenon flash tube 18. The recharge cycle begins again.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of introducing an additive into a system comprising a system fluid, the additive comprising at least one compound, comprising the steps of dissolving the additive in a carrier fluid, wherein the carrier fluid is immiscible or slightly miscible in the system fluid, delivering the additive and the carrier fluid into the system, and removing the carrier fluid from the system fluid, leaving the additive dissolved in the system fluid.

2. The method of claim 1, further comprising the step of delivering an amount of the additive into the system in concentrations of up to the solubility limit of the additive in the system fluid.

3. The method of claim 1, wherein the additive comprises at least one compound which is soluble in the system fluid and the carrier fluid, and has fluorescent properties.

4. The method of claim 1, wherein the additive comprises at least one organic compound which emits color in the visible spectrum.

5. The method of claim 1, wherein the additive comprises at least one fluorescent compound and at least one organic compound which emits color in the visible spectrum.

6. The method of claim 1, wherein the system fluid comprises PAG, POE, mineral oil or AB.

7. The method of claim 1, wherein the carrier fluid comprises alcohol.

8. The method of claim 1, wherein the carrier fluid comprises at least one of ethanol, methanol, and 2-propanol.

9. The method of claim 1, wherein the additive comprises a molecule comprising at least one cyclic group, said molecule comprising atoms selected from the group consisting of C, H, halogens, S, N, and O.

10. The method of claim 1, wherein the additive comprises an organo-metallic compound.

11. The method of claim 1, wherein the additive comprises an inorganic compound.

12. The method of claim 1, wherein the additive is selected from the group consisting of coumarin and derivatives thereof, where G represents groups comprising at least one of C, H, halogens N, and S, and j greater than or equal to 0:

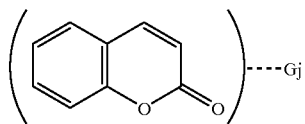

13. The method of claim 1, wherein the additive is selected from the group consisting of phenylnaphthylamines, where $R_1$, $R_2$, and $R_3$ are groups comprising at least one of C, H, halogens, N, S, and O in cyclic or acyclic structures:

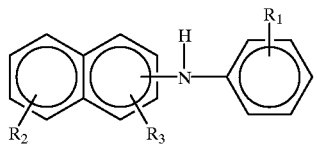

14. The method of claim 1, wherein the additive is selected from the group consisting of diphenylamines, where $R_4$ and $R_5$ are groups comprising at least one of C, H, halogens, N, S, and O in cyclic or acyclic structures:

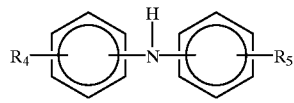

15. The method of claim 1, wherein the additive is selected from the group consisting of benzothiazolines, where $R_6$, $R_7$, $R_8$ and $R_9$ are groups comprising at least one of C, H, halogens, N, S, and O in cyclic or acyclic structures:

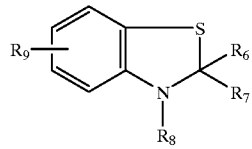

16. The method of claim 1, wherein the additive is selected from the group consisting of benzothiazoles, where $R_{10}$ and $R_{11}$ are groups comprising at least one of C, H, halogens, N, S, and O in cyclic or acyclic structures:

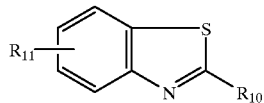

17. The method of claim 1, wherein the additive is an additive selected from the group consisting of anti-oxidation, anti-wear, anti-friction, dispersion improvement, and viscosity index improvement additives.

18. A leak detection method, comprising the steps of introducing a compound selected from the group consisting of organo-metallic compounds comprising at least one metal and at least one cyclic or acyclic structure comprising atoms selected from the group consisting of C, H, N, S, and O, wherein the at least one cyclic or acyclic group optionally includes at least one attached cyclic or acyclic structure comprised of atoms selected from the group consisting of C, H, halogens, N, S, and O into a refrigeration system comprising a fluid system, and causing the compound to fluoresce at any point in the system where there is a leak wherein the step of introducing comprises dissolving the compound in a carrier fluid, delivering the compound and the carrier fluid into the system, and removing the carrier fluid from the system fluid.

19. The method of claim 18, wherein the step of introducing the compound into the system is effected in concentration up to the solubility limit of the compound in the system fluid.

20. The method of claim 18, wherein the system fluid comprises PAG, POE, mineral oil or AB.

21. The method of claim 17, wherein the carrier fluid comprises alcohol.

22. The method of claim 17, wherein the carrier fluid comprises at least one of ethanol, methanol and 2-propanol.

23. A leak detection method comprising the step of introducing a compound capable of fluorescing into a refrigeration system having a system fluid, and causing the compound to fluoresce at any point in the system where there is a leak, wherein the compound is soluble in the system fluid and comprises at least one of phenylnaphthylamines:

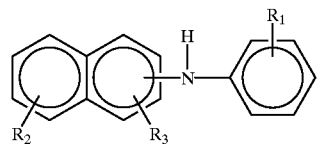

where $R_1$, $R_2$, and $R_3$ are groups comprising at least one of C, H, halogens, N, S, and O in cyclic or acyclic structures; dialkyldiphenylamines:

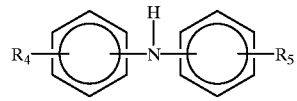

where $R_4$ and $R_5$ are groups comprising at least one of C, H, halogens, N, S, and O in cyclic or acyclic structures; organometallic compounds comprising molecular groups comprising at least one metal and at least one cyclic or acyclic structure comprising atoms selected from the group consisting of C, H, N, S, and O, wherein the at least one cyclic group optionally has at least one attached cyclic or acyclic structure comprised of C, H, halogens, N, S, and O; benzothiazolines:

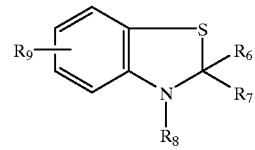

where $R_6$, $R_7$, $R_8$ and $R_9$ are groups comprising at least one of C, H, halogens, N, S, and O in cyclic or acyclic structures; and benzothiazoles:

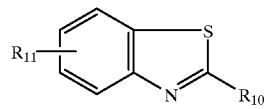

where $R_{10}$, and $R_{11}$ are groups comprising at least one C, H, halogens, N, S, and O in cyclic or acyclic structures wherein the step of introducing comprises dissolving the compound in a carrier fluid, delivering the compound and the carrier fluid into the system, and removing the carrier fluid from the system fluid.

24. The method of claim 23, wherein the step of introducing the compound into the system is effected in concentrations of up to the solubility limit of the compound in the system fluid.

25. The method of claim 23, wherein the system fluid comprises PAG, POE, mineral oil or AB.

26. The method of claim 21, wherein the carrier fluid comprises alcohol.

27. The method of claim 21, wherein the carrier fluid comprises at least one of ethanol, methanol and 2-propanol.

28. A method of detecting leaks in a refrigeration system comprising a fluid system, comprising the steps of introducing a fluorescing compound dissolved in a carrier fluid into the fluid system, wherein the carrier fluid is immiscible or slightly miscible in the system fluid, delivering the dissolved fluorescing compound and the carrier fluid into the fluid system, and detecting the leak with a UV lamp.

29. The method of claim 28, further comprising the step of removing the carrier fluid from the system fluid.

30. The method of claim 29, wherein the carrier fluid comprises alcohol.

31. The method of claim 29, wherein the carrier fluid comprises at least one of ethanol, methanol and 2-propanol.

32. The method of claim 28, wherein the UV lamp is a xenon flash tube.

33. The method of claim 32, wherein the xenon flash tube comprises a quartz glass.

34. The method of claim 32, wherein the xenon flash tube is filled with a xenon gas mixture at a pressure of less than about 4 atmospheres.

35. The method of claim 32, wherein the xenon flash tube comprises a trigger circuitry means for obtaining an adjustable or a preset flash rate.

36. The method of claim 35, wherein the means produces a flash rate from about 4 flashes per second to about 1 flash every four seconds.

37. The method of claim 32, wherein the xenon flash tube comprises a filter glass with a high degree of internal transmittance in the 180 to 390 nm ultraviolet wavelength range.

38. The method of claim 32, wherein the xenon flash tube comprises an ultraviolet flash pulse circuit.

39. The method according to claim 1, further comprising the step of detecting a leak in the system with a flashing UV lamp.

40. The method according to claim 39, the flashing UV lamp, a xenon flash tube, a trigger circuitry means for obtaining an adjustable or a preset flash rate and a filter glass.

41. The method according to claim 40, wherein the xenon flash tube comprises an ultraviolet flash pulse circuit.

42. The method according to claim 40, wherein the xenon flash tube comprises an UV flash pulse circuit.

43. The method according to claim 40, wherein the mean produces a flash rate from about 4 flashes per second to about 1 flash every four seconds.

44. The method according to claim 40, wherein the filter is applied directly to the xenon flash tube.

* * * * *